United States Patent [19]
Takahashi

[11] Patent Number: 5,960,151
[45] Date of Patent: *Sep. 28, 1999

[54] RECORDING AND REPRODUCING APPARATUS WHICH PROHIBITS COPYING OF AN EXTERNALLY SUPPLIED SIGNAL AND ALLOWS UNLIMITED COPYING OF AN INTERNALLY GENERATED SIGNAL

[75] Inventor: Koji Takahashi, Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/350,506

[22] Filed: Dec. 6, 1994

Related U.S. Application Data

[63] Continuation of application No. 08/064,772, May 19, 1993, abandoned.

[30] Foreign Application Priority Data

May 26, 1992 [JP] Japan ..................................... 4-158642

[51] Int. Cl.[6] .............................. H04N 5/91; H04N 5/225
[52] U.S. Cl. ............................... 386/94; 386/117; 360/60; 360/27; 360/15
[58] Field of Search .................................. 360/27, 15, 13, 360/60, 32; 358/311; 395/725; 380/3–5; 386/94, 117, 107, 1, 45, 95, 125, 126; 711/4; H04N 5/91, 5/225

[56] References Cited

U.S. PATENT DOCUMENTS

| | | | |
|---|---|---|---|
| 4,644,422 | 2/1987 | Bedini | 360/27 R |
| 4,849,817 | 7/1989 | Short | 358/311 X |
| 4,937,679 | 6/1990 | Ryan | 360/60 X |
| 4,991,208 | 2/1991 | Walker et al. | 380/5 |
| 5,130,864 | 7/1992 | Shimada | 360/60 |
| 5,144,658 | 9/1992 | Takahashi | 360/60 X |
| 5,159,502 | 10/1992 | Ejima et al. | 360/32 |
| 5,199,066 | 3/1993 | Logan | 380/4 |
| 5,216,712 | 6/1993 | Shimoda et al. | 360/60 X |
| 5,227,926 | 7/1993 | Nagaoka et al. | 360/15 |
| 5,428,598 | 6/1995 | Veldhuis et al. | 360/27 X |

*Primary Examiner*—Robert Chevalier
*Attorney, Agent, or Firm*—Robin, Blecker & Daley

[57] ABSTRACT

In an recording and reproducing apparatus which is arranged to receive a plurality of kinds of input signals and record one of the input signals as a digital signal and also to reproduce and output the recorded signal, the kinds of the respective input signals are detected and permission or inhibition of the subsequent copying of the input signals is determined on the basis of their respective detected kinds. If the input signals contains a signal whose subsequent copying is beforehand permitted, copying of the signal is permitted, while if the input signals contains a signal whose subsequent copying is beforehand inhibited, copying of the signal is inhibited.

28 Claims, 6 Drawing Sheets

RECORDING AND REPRODUCING APPARATUS WHICH PROHIBITS COPYING OF AN EXTERNALLY SUPPLIED SIGNAL AND ALLOWS UNLIMITED COPYING OF AN INTERNALLY GENERATED SIGNAL

This is a continuation application under 37 CFR 1.62 of prior application Ser. No. 08/064,772, filed May 19, 1993, now abandoned.

BACKGROUND OF THE INVENTION

1. Field of the Invention

The present invention relates to a recording and reproducing apparatus arranged to perform digital recording and reproduction of an audio signal, a video signal and the like.

2. Description of the Related Art

A recording and reproducing apparatus which is called "DAT (digital audio tape recorder)" has heretofore been known. In the recording and reproducing apparatus, an audio signal is digitally recorded and reproduced on and from a magnetic tape by using a rotary head.

Recently, for the purpose of copyright protection, a system for managing an information copying operation, which is called "SCMS (serial copy management system)", has been introduced into such a DAT.

This system is intended to impose a certain limitation on the operation of performing serial copying. In the SCMS, if a tape on which original information is recorded is referred to as "first-generation tape", copying of a digital audio signal from the first-generation tape to a "second-generation" tape is permitted, but copying of the digital audio signal to a "third-generation" tape, "fourth-generation" tape or later is inhibited.

However, since the above-described SCMS unconditionally imposes the limitation on the number of times of copying operations, a DAT user encounters the following problem in the case of a tape for which it is not necessary to impose any particular limitation on the number of times of copying operations, such as an original tape on which the DAT user himself has made a recording by using a microphone. For example, even if the DAT user desires to produce a plurality of copies of the third generation or later from his original tape to distribute them to other persons, he will be inconveniently inhibited from producing such copies.

Also, developments of digital VTRs arranged to perform digital recording of video signals have recently been in progress. If the SCMS is introduced into such a digital VTR, for example, the following problem will occur.

In general, a process for producing an original work by using a video camera-integrated type VTR includes the steps of making tape recordings of a multiplicity of materials by using a video camera and a microphone, then assembling and editing the tape-recorded materials to prepare a tape of the second generation, then adding music, such as BGM (background music), to the tape, and finally performing predetermined processings such as mixing-down of the sound recordings, thereby finishing the original work in the form of a recording made on a tape of the third generation.

Accordingly, although in the simplest process it is possible to finish the work on the second-generation tape, it is commonly necessary to make tape copies of up to at least the third generation. If the quality of the work is to be further improved, it is necessary to make a tape copy of the fourth generation or later. However, if the tape copy of the fourth generation or later is to be prepared, the SCMS will serve as a very inconvenient system.

SUMMARY OF THE INVENTION

It is, therefore, an object of the present invention to solve the above-described problems.

To achieve the above object, in accordance with one aspect of the present invention, there is provided a recording apparatus which comprises information collecting means, external input means for inputting a signal which is externally supplied, recording means for recording, as a digital signal, either one of information collected by said information collecting means and the signal inputted from said external input means, and copy management means for enabling, if the signal inputted from said external input means is to be recorded, a copying inhibition signal to be recorded together with the signal inputted from said external input means.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Figure 1:
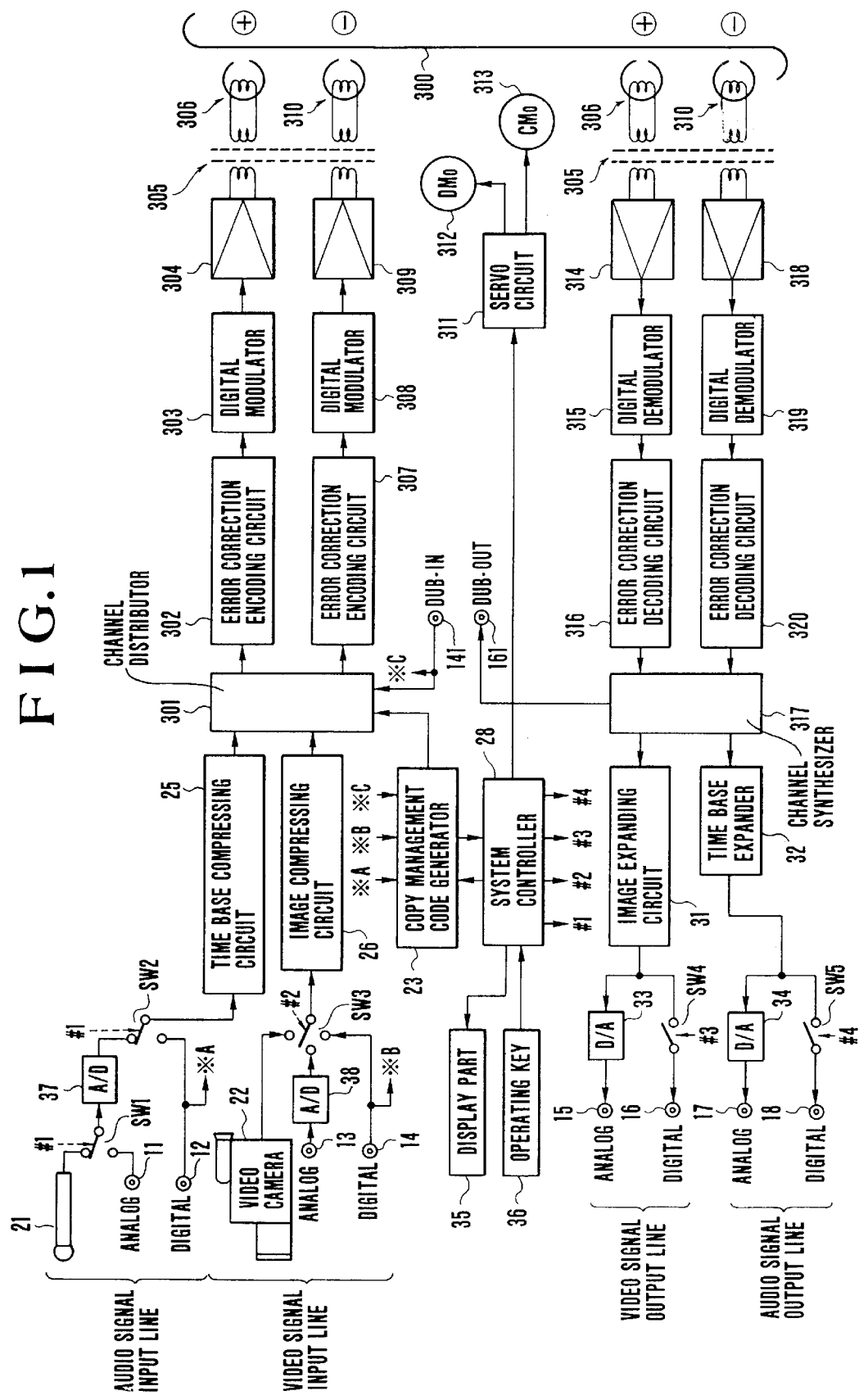
FIG. 1 is a block diagram showing the arrangement of a video camera-integrated type digital VTR according to a first embodiment of the present invention.

Preferred embodiments of the present invention will be described below with reference to the accompanying drawings.

First, a copy management system for a recording and reproducing apparatus according to the present invention will be described below.

Table 1 shows a copy management code which is set for the purpose of copy management based on the above-described SCMS, as well as the definition of the copy management code. The copy management code is recorded on a tape together with other information.

TABLE 1

| COPY MANAGEMENT CODE | DEFINITION ACCORDING TO SCMS |
|---|---|
| 00 | PERMIT COPYING |
| 10 | INHIBIT COPYING |
| 11 | PERMIT COPYING ONLY ONCE |
| 01 | UNDEFINED |

The operation of a recording side of the recording and reproducing apparatus at the time of reception of a copy management code reproduced during reproduction from a tape will be described below with reference to Table 1. The copy management code "00" indicates that digital data can be copied in digital form. The copy management code "10" indicates that digital-to-digital copying is inhibited and also that copying of information is permitted only in the form of an analog signal, i.e., only so-called analog copying is permitted. The copy management code "11" indicates that copying of digital data is permitted only once. The copy management code "01" is left undefined.

Table 2 shows a category code indicative of the kinds of information signal sources. The category code consists of 8-bit data which is set so that it can be used in an input selector of AV (audio and video) equipment for the purpose of identifying each individual information source.

TABLE 2

| CATEGORY CODE | SIGNAL SOURCE |
| --- | --- |
| 00000000 | OTHER GENERAL SOURCES |
| 10000000 | CD |
| 11000000 | DAT |
| 11000001 | DAT:P |
| 00110000 | DIGITAL VTR |
| 00110001 | DIGITAL VTR:P |
| 00111000 | CAMERA-INTEGRATED TYPE VTR |

The SCMS is formed by the combination of the aforesaid two kinds of codes, the copy management code and the category code. Although the copy management code is a 2-bit code, there is also provided a system which uses a copy management code consisting of a 1-bit code as will be described later. In such a system, it is possible to determined whether analog copying is possible, whether digital copying is permitted only once, and so on, by detecting what type of information signal source is used.

Table 3 shows a specific example of a copy management code which is assigned to each individual tape when a second-generation tape is to be produced from a first-generation tape in a digital VTR.

TABLE 3

| MANAGEMENT CODE FIRST-GENERATION TAPE | CATEGORY | TYPE OF COPYING LIMITATION | MANAGEMENT CODE SECOND-GENERATION TAPE |
| --- | --- | --- | --- |
| 00 | DIGITAL VTR | PERMITTED | 00 |
| 10 | DIGITAL VTR | INHIBITED | 10 |
| 11 | DIGITAL VTR:P | INHIBITED | 10 |

According to Table 3, if the copy management code of a first-generation tape is "00" and the category "DIGITAL VTR" is selected, it is determined that copying is permitted, and the copy management code "00" is recorded on a second-generation tape. If the copy management code of the first-generation tape is "10" and the category "DIGITAL VTR" is similarly selected, it is determined that copying is inhibited, and the copy management code "10" is recorded on the second-generation tape. If the copy management code of the first-generation tape is "11", the category is set to "DIGITAL VTR:P" for convenience' sake and a copying inhibition code is outputted, although at this time only, the apparatus is controlled so that digital copying is executable. However, the copy management code "10" is recorded on the second-generation tape to inhibit digital copying of the third generation or later.

Table 4 shows a copy management code which is assigned to each individual tape in the case of the category "VIDEO CAMERA-INTEGRATED TYPE VTR".

TABLE 4

| MANAGEMENT CODE FIRST-GENERATION TAPE | CATEGORY | TYPE OF COPYING LIMITATION | MANAGEMENT CODE SECOND-GENERATION TAPE |
| --- | --- | --- | --- |
| 00 | VIDEO CAMERA-INTEGRATED TYPE VTR | PERMITTED | 00 |
| 10 | VIDEO CAMERA-INTEGRATED TYPE VTR | INHIBITED | 10 |
| 11 | VIDEO CAMERA-INTEGRATED TYPE VTR:P | INHIBITED | 10 |

In Table 4, there is shown the manner in which the copy management code "00" is assigned to a recording tape (first-generation tape) on which original information is recorded by the video camera-integrated type VTR and a second-generation tape takes over the copy management code "00" from the first-generation tape. The copy management code "00" is similarly taken over by copies of the third generation or later, so that these copies are released from the limitations of digital copy management.

However, regarding an external digital input signal inputted from an external input terminal, a copying inhibition code or a code for permitting copying only once is set similarly to the codes for recording apparatus belonging to the other categories. In other words, in this case, the copy management code "10" indicative of inhibition of copying is recorded on the second-generation tape on which a copy has been made.

Incidentally, there also exists an apparatus of the type in which the type of a copying limitation is determined on only-one-bit basis, for various historical reasons such as the development history of DAT products and the standardization history of the SCMS. To assure the compatibility of such an apparatus with newly developed products, the category code is used together with the copy management code. Also, if a copy management code is newly set for the video camera-integrated type VTR, a simpler arrangement can be realized.

The video camera-integrated type VTR according to the first embodiment of the present invention will be described below.

FIG. 1 is a block diagram showing the arrangement of the video camera-integrated type digital VTR according to the first embodiment of the present invention.

In the shown video camera-integrated type digital VTR, audio information, such as a sound captured by a microphone 21, is outputted in the form of an analog signal, and is then inputted into a switch SW1 together with an analog audio signal inputted from an external audio input terminal 11. The analog audio signal selected by the switch SW1 is inputted into an analog-digital (A/D) converter 37, in which the analog audio signal is converted into digital data.

In the meantime, a digital audio signal is inputted from an external audio input terminal 12, and is then inputted into a switch SW2 together with the digital data outputted from the A/D converter 37. A digital data string selected by the switch SW2 is supplied to a time base compressing circuit 25, in which the digital data string is subjected to time base compression.

In the present embodiment, a video signal formed by a video camera 22 is assumed to be a digital signal. As a technique for outputting a digital video signal from the video camera 22, the technique of outputting digital data formed by quantization of, for example, 8 bits for each pixel has been implemented by recent advances in the digitization of signal processing for digital cameras. However, detailed description thereof is omitted herein for the sake of simplicity.

An analog video signal and a digital video signal are respectively inputted from external video input terminals 13 and 14, and the analog video signal inputted from the external video input terminal 13 is converted into a digital video signal by an A/D converter 38. The digital video signal from the external video input terminal 14, the digital video signal from the A/D converter 38 and the digital video signal from the video camera 22 are supplied to a switch SW3. The switch SW3 selects and outputs one of the three digital video signals.

The digital video signal outputted from the switch SW3 is supplied to an image compressing circuit 26, in which the digital video signal is subjected to compression of image information (data). In general, in consumer's digital VTRs, to record the image information (data) on a tape without unnecessary consumption thereof, it is desired to compress the image information (i.e., reduce the amount of data of the image information) at a high compression ratio. For example, coordinate transformation techniques such as DCT (discrete cosine transform) are employed to perform compression of approximately ¼–⅒. As a result, a certain degree of deterioration of image quality is caused by such a compression processing as well as by performing an image information (data) expansion processing corresponding to the compression processing.

To prevent a deterioration from occurring in image quality owing to repetitions of dubbing (tape copying, information copying or the like), the present embodiment is provided with a dubbing input terminal 141 so that dubbing can be performed in the form of a compressed digital video signal. A signal formed by time-base multiplexing a digital audio signal and digital video signal is inputted to the dubbing input terminal 141. The signal has a form extremely close to the form of a signal to be recorded.

A copy management code generator 23 receives the digital audio signal (*A) inputted to the terminal 12, the digital video signal (*B) inputted to the terminal 14, and the aforesaid time-base multiplexed signal (*C) inputted to the terminal 141, and then extracts copy management codes added to the respective digital signals. The copy management code generator 23 generates copy management information to be newly copied as will be described later, from the extracted copy management codes and information supplied from a system controller 28.

Which of the digital signals is to be recorded as a recording signal and which of the modes of the VTR is to be selected are determined by an operating key 36 operated by an operator. The system controller 28 determines the mode of the VTR in accordance with the state of operation of the operating key 36, and executes selection of digital audio and video signals to be recorded by means of selection signals #1 and #2. The signal #1 is a signal for controlling the switches SW1 and switch SW2, while the signal #2 is a signal for controlling the switch SW3. Each of the signals #1 and #2 consists of data of 2 bits or more.

A display part 35 displays the mode of the VTR, an answer given by the system and so on, and is driven on the basis of data supplied from the system controller 28. The system controller 28 outputs control data to a servo circuit 311 in accordance with the selected mode and causes the servo circuit 311 to control a drum motor 312 for rotating a rotary drum equipped with rotary recording heads 306 and 310 as well as a capstan motor 313 for driving a magnetic tape 300.

The digital audio signal from the time base compressing circuit 25, the compressed digital video signal from the image compressing circuit 26, and the copy management code from the copy management code generator 23 are inputted into a channel distributor 301. The channel distributor 301 forms an information block containing these signals and codes, and distributes the information block to individual recording channels.

In the present embodiment, the channel distributor 301 distributes the information block into two channels, a channel leading to a head of plus (+) azimuth and a channel leading to a head of minus (−) azimuth, and outputs to the respective channels time division multiplexed signals each including the digital video signal, the digital audio signal and the copy management code.

The respective time division multiplexed signals outputted from the channel distributor 301 are supplied to error correction encoding circuits 302 and 307, in which check codes are added to the time division multiplexed signals as error correcting codes, respectively. The outputs from the error correction encoding circuits 302 and 307 are subjected to digital modulation in digital modulators 303 and 308 in order to reduce the DC components and low-frequency signals of the respective outputs. After that, the digital modulators 303 and 308 supply the digitally modulated signals to recording amplifiers 304 and 309, respectively. The signals amplified by the recording amplifiers 304 and 309 are respectively supplied to the rotary recording heads 306 and 310 via a rotary transformer 305, and the rotary recording heads 306 and 310 form a multiplicity of parallel tracks on the magnetic tape 300 as shown in FIG. 2.

Figure 2:
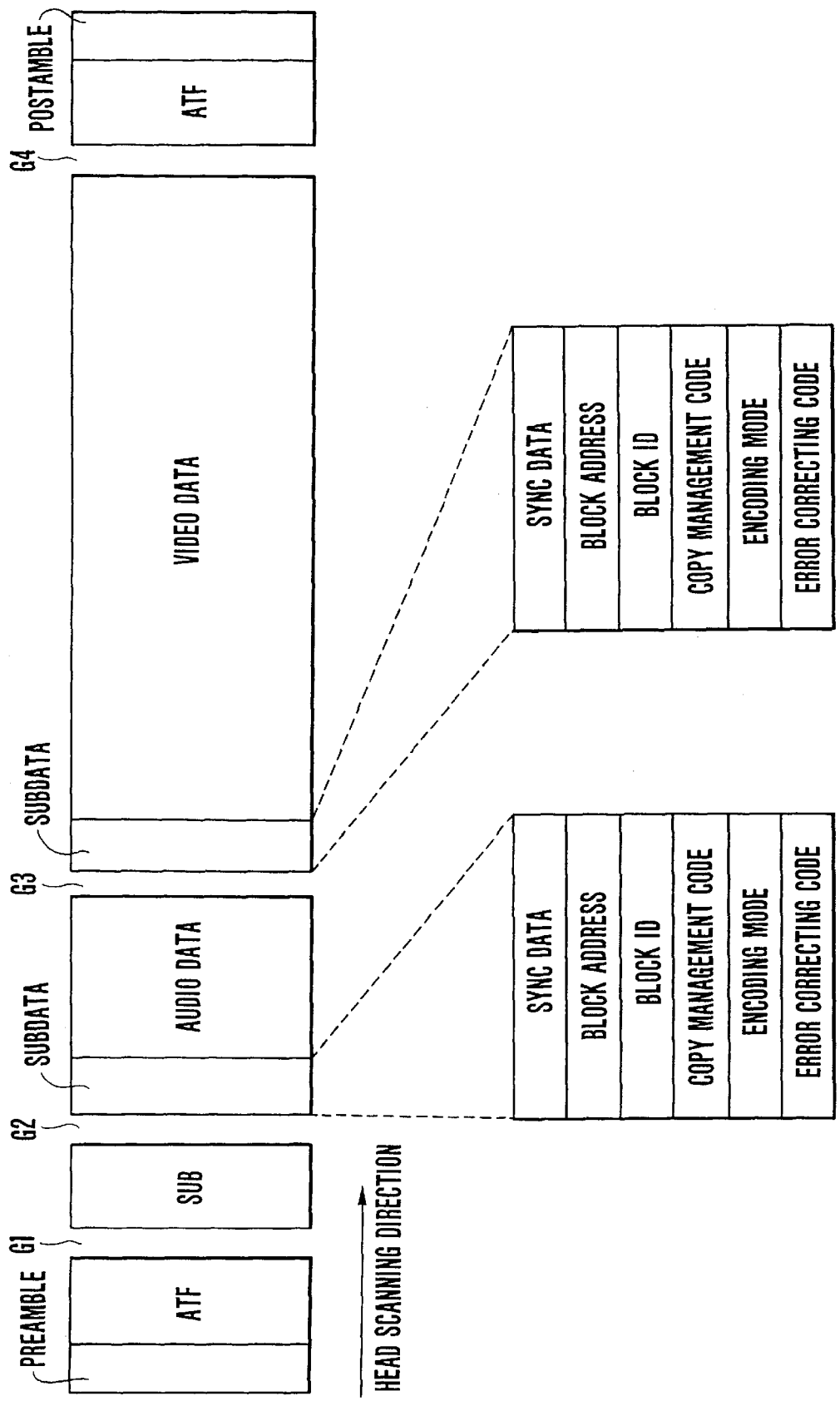
FIG. 2 is a view showing a recording pattern in which data is recorded on a tape by the apparatus of FIG. 1.

FIG. 2 shows a recording pattern which is formed on the magnetic tape 300 in the digital VTR according to the present embodiment, and the shown recording pattern corresponds to one track.

Each signal recording area will be described below in the order of recordings made by the rotary recording heads 306 and 310. First, a preamble part is formed as a preparatory part for data reading, followed by an ATF (automatic track finding) part. On the ATF part, a tracking control signal is recorded which is similar to that employed in a so-called area division tracking system used for DATs.

The ATF part is followed by a subdata part SUB, and they are separated by a guard area G1. Since the guard area G1 and a guard area G2 are respectively provided before and after the subdata part SUB, it is possible to perform recording and reproduction of only the subdata part, and also to rewrite only the subdata part SUB.

The subdata part SUB contains, for example, a time code indicative of the year/month/day, month/day or the like of photography conducted with the video camera 22, and index information for cueing. Also, character information, TVFAX information and other similar information to be displayed on a television receiver can be stored in the subdata part SUB. The subdata part SUB can be rewritten during postrecording because of the nature of such information.

After the guard area G2, audio data is recorded, and after the guard area G3, video data is recorded. As shown, subdata areas are provided which are respectively inseparable from the audio data and the video data. The copy management code is recorded in each of the subdata areas. As can be seen from the illustration of FIG. 2, it is impossible to independently rewrite the copy management code after recording.

Although the audio data and the video data are respectively recorded in independent areas separated by the guard area G3, the subdata, such as the copy management codes, are recorded in the leading parts of the audio and video data. The subdata consists of sync data, a block address, a block ID, the aforesaid copy management code, an encoding mode for identifying a sampling frequency, the number of bits for quantization and a data compressing method, an error correcting code, such as CRCC or the Reed-Solomon code, for detection and correction of a data error introduced during recording or reproduction of data, and so forth.

After the video data part, an ATF part is provided with a guard area G4 interposed therebetween. The aforesaid tracking control signal is recorded on the ATF part. This ATF part serves to provide a tracking reference at each end of the track. After the ATF part, a postamble part is provided, and a signal similar to that recorded on the preamble part is recorded on the postamble part.

Figure 3:
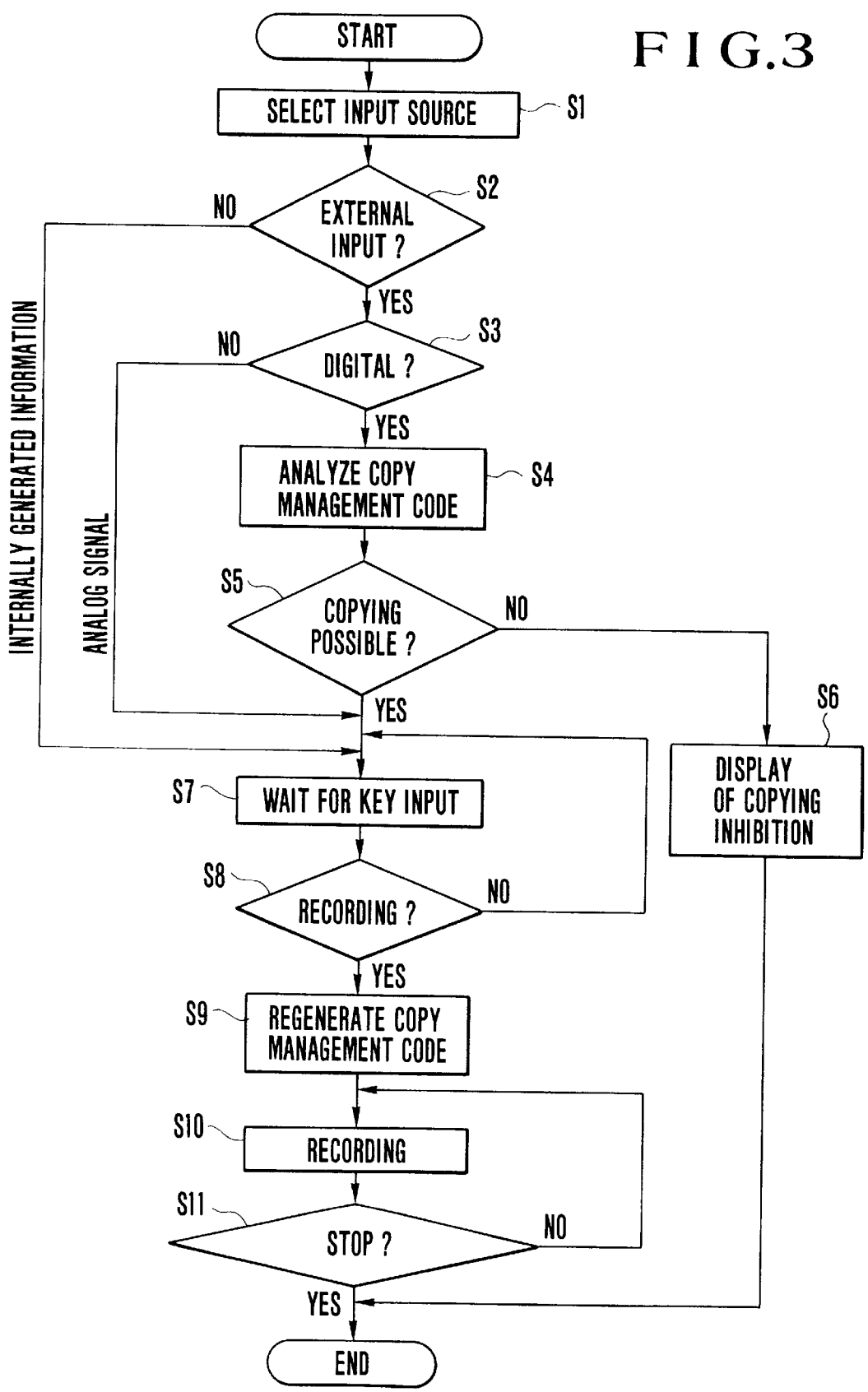
FIG. 3 is a flowchart which serves to explain the operation of a system controller provided in the apparatus of FIG. 1.

The operation of the system controller 28 during recording will be described below with reference to the flowchart of FIG. 3.

First, in Step S1, desired audio and video input sources are selected through the operating key 36. If internal inputs are specified as the input sources, that is, if the microphone 21 and the video camera 22 are specified as the input sources, the flow proceeds from Step S2 to Step S7. In Step S7, the flow waits for a recording instruction to be inputted. If external inputs are specified as the input sources, the flow proceeds to Step S3, in which it is determined whether the external input signal is an analog signal or a digital signal. If the external input signal is an analog signal, recording is permitted because of the presence of a signal deterioration due to dubbing, and the flow proceeds to Step S7. On the other hand, if the external input signal is a digital signal, the flow proceeds to Step S4, in which the copy management code extracted by the copy management code generator 23 is analyzed.

If it is determined from the copy management code that copying is possible (Step S5), the flow proceeds to Step S7, in which the flow waits for a recording instruction to be inputted. On the other hand, if it is determined that copying is impossible, the flow proceeds from Step S5 to Step S6, in which the display part 35 is made to provide a display to the effect that copying is inhibited. Thus, the processing is brought to an end.

If the recording instruction is executed in Step S8, the copy management code generator 23 is made to generate a new copy management code in Step S9. The generation of the copy management code will be described later. Then, actual recording is performed (Step S10), and when a recording stop instruction is executed (Step S11), the processing is brought to an end.

Returning to FIG. 1, the operation of the system controller 28 during reproduction will be described below.

The digital signals which have been recorded in the above-described manner are reproduced by the rotary heads 306 and 310 (which serve also as recording heads), and are then supplied to corresponding reproducing amplifiers 314 and 318 via the rotary transformer 305. The two-channel reproduced signals outputted from the respective reproducing amplifiers 314 and 318 are inputted into digital demodulators 315 and 319, respectively.

The time division multiplexed digital signals demodulated by the respective digital demodulators 315 and 319 are inputted into error correction decoding circuits 316 and 320. In the circuits 316 and 320, code errors introduced on a transmission path are corrected, and the signals outputted from the error correction decoding circuits 316 and 320 are supplied to a channel synthesizer 317. A time division multiplexed signal obtained by combining the signals by the channel synthesizer 317 is supplied to a dubbing output terminal 161, and is also inputted into an image expanding circuit 31 and a time base expanding circuit 32.

The image expanding circuit 31 subjects compressed image information to an image information expanding processing corresponding to the processing performed by the image compressing circuit 26, and outputs the original digital video signal. This digital video signal is supplied to a digital-analog (A/D) converter 33, and the resultant analog signal is outputted from an analog video output terminal 15. If a digital output permission signal (#3) is outputted from the system controller 28 in response to an operation of the operating key 36, the digital video signal outputted from the image expanding circuit 31 is outputted without modification from a digital output terminal 16 via a switch SW4.

A digital audio signal whose time base is expanded by a time base expander 32 is supplied to a D/A converter 34, and an analog audio signal formed by the D/A converter 34 is outputted from a terminal 17. If a digital output permission signal (#4) is outputted from the system controller 28, the digital audio signal is outputted without modification from a digital output terminal 18 via a switch SW5.

Table 5 serves to explain an example of the relationship between the information sources used in the embodiment of FIG. 1 and the copy management code, that is, the operation of the copy management code generator 23.

TABLE 5

| INFORMATION SOURCE | COPY MANAGEMENT CODE |
| --- | --- |
| EXTERNAL INPUT | INHIBIT (01) |
| BUILT-IN SENSOR (INFORMATION COLLECTING MEANS) | PERMIT (00) |

In Table 5, in the case of the external input, since it is possible that information which needs copyright protection may be inputted from any of the above-described external input terminals 11 to 14, the copy management code "INHIBIT" is set. In the case of the built-in sensor, that is, the information collecting means such as the microphone 21 and the video camera 22, since it is determined that information obtained from such information collecting means is recorded by a copyright holder himself, the copy management code "PERMIT" is set.

Although in the above-described example the copy management code "INHIBIT" is set for any external input information, the copy management code "PERMIT" may be set only when the external input information is analog information. This setting can be easily realized by altering the operational algorithm of the copy management code generator 23.

To allow a photographer to inhibit dubbing of information recorded by photography performed by the photographer himself by means of the video camera 22, an operating key may be separately provided. In this arrangement, the copy management code can be forcedly changed to "INHIBIT" by an operation of the operating key.

Figure 4:
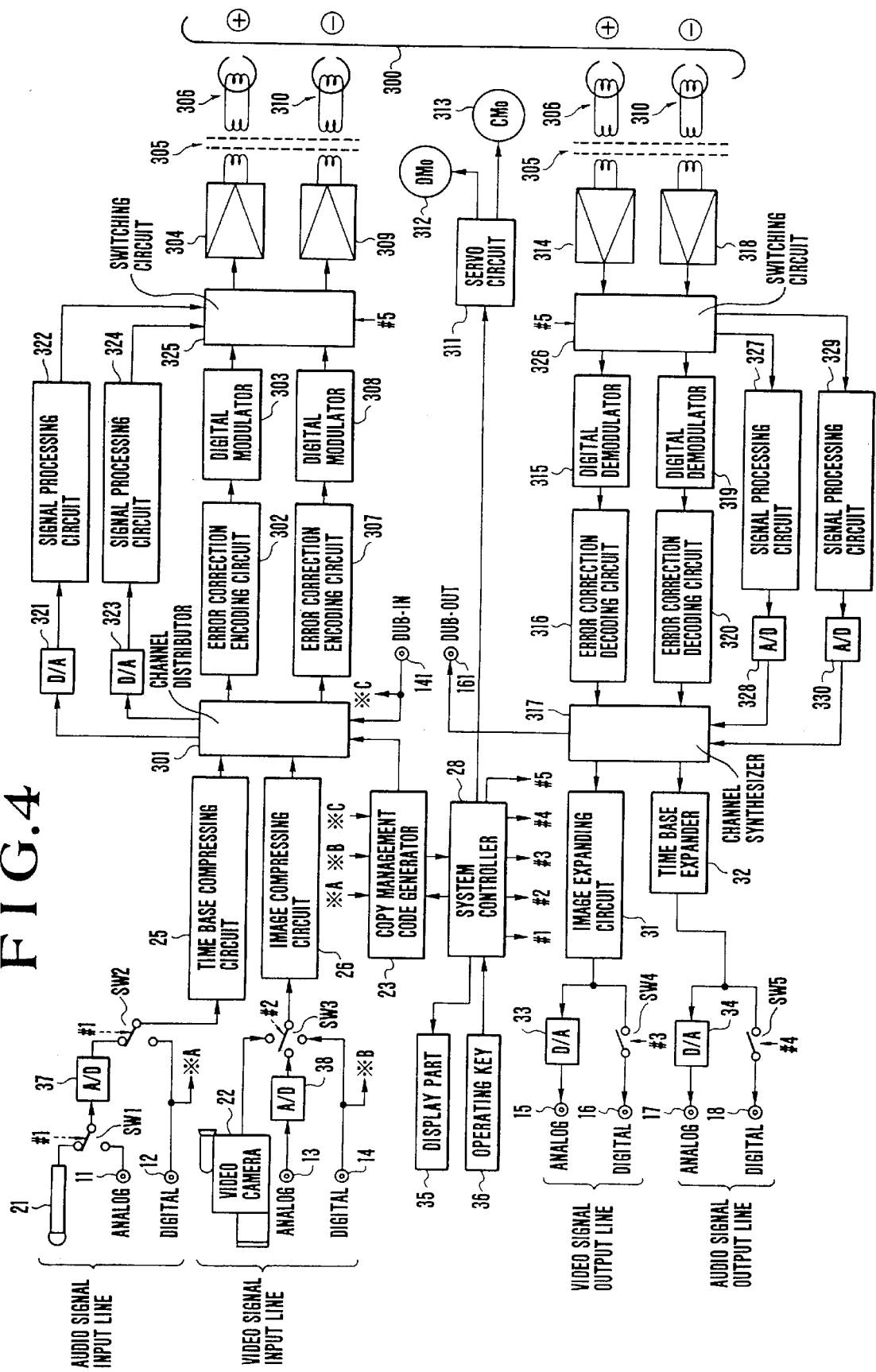
FIG. 4 is a block diagram showing the arrangement of a video camera-integrated type VTR according to a second embodiment of the present invention.
Figure 5:
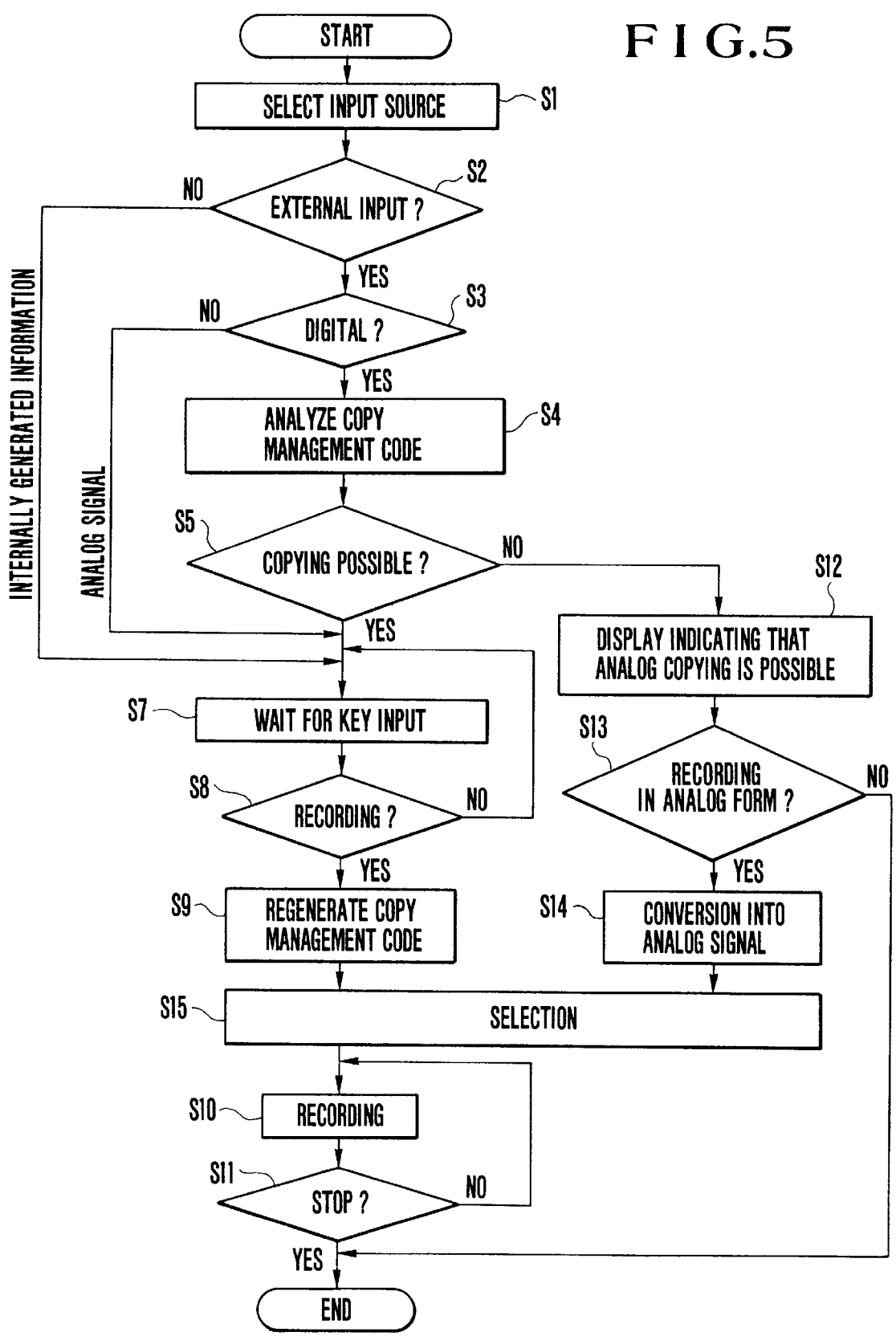
FIG. 5 is a flowchart which serves to explain the operation of a system controller provided in the apparatus of FIG. 4.

The first embodiment has been described with reference to the example in which the copy management code is set in accordance with whether copying is possible or impossible. Another case in which the above-described analog copying is possible will be described below with reference to FIGS. 4 and 5. In FIGS. 4 and 5, the same reference numerals are used to denote parts which function similarly to those shown in FIGS. 1 and 3.

FIG. 4 is a block diagram showing the arrangement of a video camera-integrated type VTR according to a second embodiment of the present invention in which both digital and analog signals can be recorded and reproduced. In the arrangement shown in FIG. 4, output signals from the channel distributor 301 are converted into analog signals by D/A converters 321 and 323, respectively, and the analog signals are subjected to the processings required for normal analog recording by signal processing circuits 322 and 324, respectively. The processed analog signals are outputted to a switching circuit 325. The switching circuit 325 responds to a signal (#5) supplied from the system controller 28 to perform switching between the aforesaid analog signals and the digital signals supplied from the digital modulators 303 and 308, thereby selectively outputting the analog and digital signals.

During reproduction, signals from the reproducing amplifiers 314 and 318 are inputted into a switching circuit 326. The switching circuit 326 performs switching in response to the signal (#5) supplied from the system controller 28, thereby selectively outputting the input signals to the digital demodulators 315 and 319 and to signal processing circuits 327 and 329. The signal processing circuits 327 and 329 apply predetermined processings to the respective reproduced analog signals, and the processed analog signals are converted into digital signals by corresponding A/D converters 328 and 330. The A/D converters 328 and 330 output the digital signals to the channel synthesizer 317.

The operation of the system controller 28 when the copy management code of an internal or external input signal indicates that copying is inhibited or that analog copying is possible will be described below with reference to the flowchart of FIG. 5.

If it is determined in Step S5 that copying (digital copying) of a digital signal is impossible, the flow proceeds to Step S12, in which a display indicating that analog copying is possible is provided. At this time, if execution of analog recording is specified through the operating key 36 (Step S13), the digital signal is converted into an analog signal (Step S14), and the analog signal is selected by the switching circuit 325 (Step S15) and is then subjected to recording (Step S10). On the other hand, if no analog copying is specified in Step S13, the flow is brought to an end.

In the above-described second embodiment, processings performed after it has been determined in Step S5 that digital copying is possible are identical to those described in connection with the first embodiment. After that, the digital signal is selected by the switching circuit 325 and is then subjected to recording.

As described above, according to the second embodiment, even if digital copying is impossible, analog copying is possible. Furthermore, if digital recording is to be performed, it is also possible to generate and record the copy management code as described previously.

Figure 6:
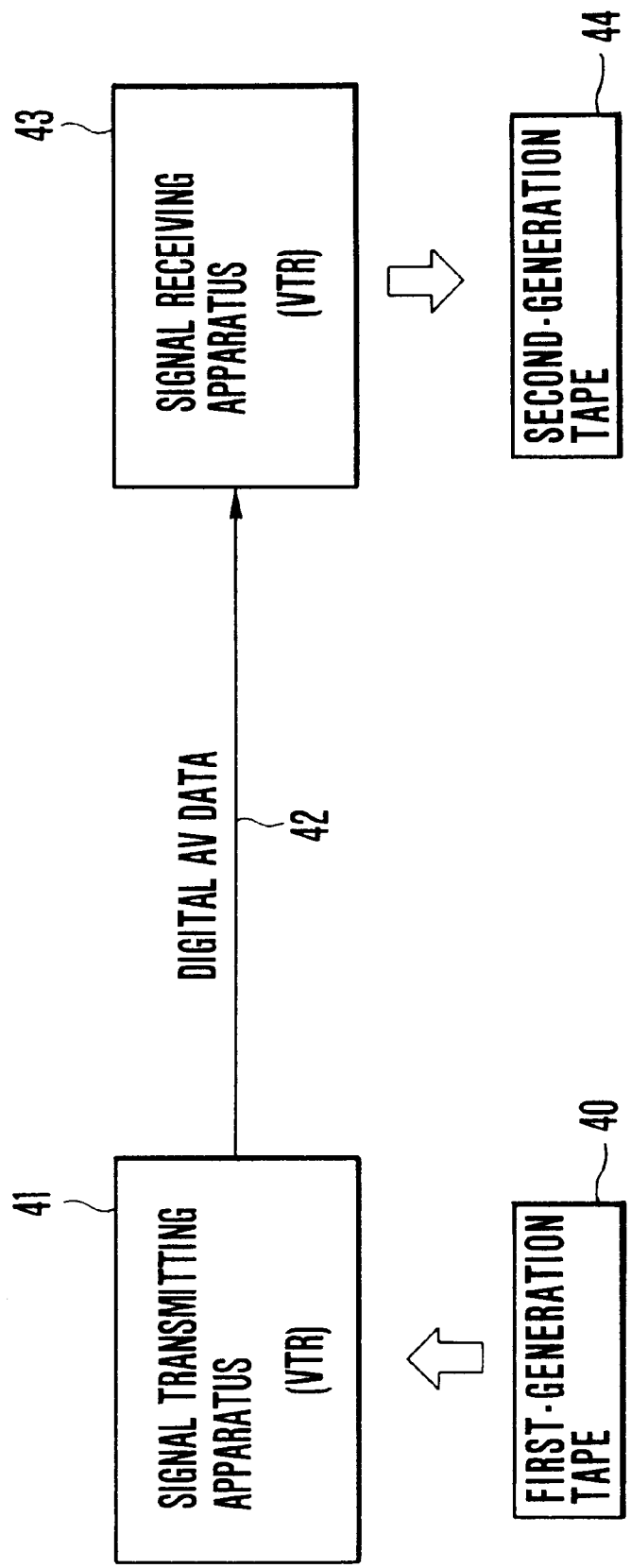
FIG. 6 is a block diagram showing the arrangement of individual apparatus which is adapted to perform copying by using the apparatus of FIG. 1 or 4.

FIG. 6 shows a connection example in which a signal transmitting apparatus and a signal receiving apparatus are connected to each other so that a copying operation can be performed.

Referring to FIG. 6, digital AV data, which is formed by multiplexing video information, audio information and various other control or identification signals, is transmitted over a communication path 42 from a signal transmitting apparatus 41 such as one VTR in which a first-generation tape 40 is reproduced as a master tape, to a signal receiving apparatus 43 such as another VTR. The signal receiving apparatus 43 records the digital AV data on a second-generation tape 44. At this time, according to the rules specified in Tables 3, 4 and 5, the copy management code is recorded on the second-generation tape 44.

By way of example, the above referred to has referred to the video camera-integrated type VTR in which a digital VTR is integrally incorporated into a video camera. However, the present invention may be applied to a video camera-integrated type VTR in which a video camera is assembled integrally with a VTR which is provided with a PCM audio feature so that a video signal is recorded in analog form and only an audio signal is recorded in digital form, for example, some types of 8 mm video VTRs conforming to the existing VTR standards or some types of VTRs conforming to VHS, a high-image-quality television system or the like. In such an arrangement, the above-described copy management code is recorded as the subcode of PCM audio data.

According to the above-described embodiments of the present invention, only when an input from external input means is to be recorded on a recording medium, recording of a copying inhibition signal on the recording medium is enabled, whereas only when information from information collecting means is to be recorded on the recording medium, recording of a copying permission signal on the recording medium is enabled. Accordingly, if a user himself desires to make his original work containing music and/or an image, he can freely perform digital dubbing (copying), so that it is possible to make a high-quality work without deteriorating signal quality.

Since the number of times of copying operations is not limited, the user can repeat a complicated editing operation over and over again until he attains a satisfactory result. Accordingly, it is possible to create a high-quality work.

Furthermore, the present invention can be applied not only to a digital VTR but also to the PCM audio feature of a high-image-quality analog VTR. Accordingly, the present invention can achieve the great advantages of expanding the range of applications of digital recorders while protecting the rights of copyright holders similarly to the conventional SCMS.

What is claimed is:

1. A recording apparatus, comprising:
    (a) an internal information signal source for internally collecting an original information signal in said apparatus;
    (b) external input means for inputting an external information signal which is externally supplied;
    (c) recording means for selectively recording, as a digital signal, either one of the original information signal internally collected by said internal information signal source in said apparatus and the external information signal inputted by said external input means;
    (d) control means for generating a copy control signal which indicates permission or inhibition of copying of the digital signal, said recording means recording the copy control signal, wherein said apparatus has a first mode in which said recording means records the original information signal collected by said internal information signal source and said control means generates the copy control signal indicating unlimited permission of copying of the digital signal and a second mode in which said recording means records the external information signal inputted by said external input means and said control means generates the copy control signal indicating inhibition of copying of the digital signal; and said apparatus having said internal information signal source, said external input means, said recording means and said control means provided integratedly with said apparatus.

2. An apparatus according to claim 1, wherein said internal information signal source includes a video camera and a microphone.

3. An apparatus according to claim 1, wherein said external input means inputs analog and digital audio signals, said external input means also inputting analog and digital image signals.

4. An apparatus according to claim 3, further comprising A/D conversion means for converting the analog audio signal inputted from said external input means and the audio signal inputted from said microphone into a digital audio signal, said A/D conversion means also converting the analog image signal inputted from said external input means into a digital image signal.

5. An apparatus according to claim 4, further comprising time base compressing means for compressing a time base of the digital audio signal.

6. An apparatus according to claim 5, further comprising image compressing means for compressing the digital image signal.

7. An apparatus according to claim 6, wherein said recording means records the digital audio signal supplied from said time base compressing means, said recording means also recording the digital image signal supplied from said image compressing means.

8. An apparatus according to claim 7, further comprising reproduction means for reproducing the digital signal recorded by said recording means and time base expanding means for expanding the time base of the digital audio signal.

9. An apparatus according to claim 7, further comprising reproduction means for reproducing the digital signal recorded by said recording means and image expanding means for expanding the reproduced digital signal.

10. An apparatus according to claim 1, further comprising reproduction means for reproducing the digital signal recorded by said recording means and D/A conversion means for converting the digital signal reproduced by said reproducing means into an analog signal.

11. An apparatus according to claim 10, further comprising output means for outputting the analog signal supplied from said D/A conversion means.

12. A video camera integrated type recording apparatus, comprising:

a) external input means for externally inputting an external information signal from a source other than the video camera;

b) recording means for selectively recording an information signal obtained by the video camera and the external information signal inputted by said external input means;

c) control means for outputting a copy control signal indicative of permission or inhibition of copying of the information signal, said recording means recording the copy control signal, wherein said apparatus has a first mode in which said recording means records the information signal obtained by the video camera and said control means generates the copy control signal indicating unlimited permission of copying of the recorded information signal and a second mode in which said recording means records the external information signal inputted by said external input means and said control means generates the copy control signal indicating inhibition of copying of the recorded information signal; and said apparatus having said external input means, said recording means and said control means provided integratedly with said apparatus.

13. An apparatus according to claim 12, wherein said information signal inputted by said external input means includes the copy control signal, and wherein said control means controls a recording of the information signal inputted by said external input means according to the copy control signal included in the information signal.

14. An apparatus according to claim 12, wherein the information signal inputted by said external input means includes another copy control signal and wherein said control means outputs the copy control signal depending upon the another copy control signal included in the information signal inputted by said external input means according to the recording of the information signal inputted by said external input means.

15. An apparatus according to claim 12, wherein said control means outputs a predetermined signal of the copy control signal indicating permission of copying of the information signal according to a recording of the information signal generated by said video camera.

16. An apparatus according to claim 12, further comprising a microphone for obtaining an audio signal.

17. An apparatus according to claim 12, further comprising compressing means for compressing the information signal to be recorded by said recording means.

18. An apparatus according to claim 17, wherein said external input means inputs a compressed information signal which is externally supplied, wherein said recording means also records the compressed information signal inputted by said third means.

19. An apparatus according to claim 12, wherein said recording means records the information signal as a digital signal.

20. A microphone integrated type recording apparatus, comprising:

a) external input means for externally inputting an external information signal from a source other than a microphone;

b) recording means for selectively recording the information signal obtained by the microphone and the external information signal inputted by said external input means;

c) control means for outputting a copy control signal indicative of permission or inhibition of copying of the information signal, said recording means recording the copy control signal, wherein said apparatus has a first mode in which said recording means records the information signal obtained by the microphone and said control means generates the copy control signal indicating unlimited permission of copying of the recorded information signal and a second mode in which said recording means records the external information signal inputted by said external input means and said control means generates the copy control signal indicating inhibition of copying of the recorded information signal; and said apparatus having said external input means, said recording means and said control means provided integratedly with said apparatus.

21. An apparatus according to claim 20, wherein said control means is capable of outputting the copy control signal indicating permission of copying of the information signal according to a recording of the information signal generated by said microphone and outputs the copy control signal indicating inhibition of copying of the information signal inputted by said external input means and said recording means also records the copy control signal.

22. An apparatus according to claim 20, wherein the information signal inputted by said external input means includes the copy control signal, and wherein said control means controls a recording of the information signal inputted by said external input means according to the copy control signal included in the information signal.

23. An apparatus according to claim 20, wherein the information signal inputted by said external input means includes another copy control signal and wherein said control means outputs the copy control signal depending upon the another copy control signal included in the information signal inputted by said external input means according to the recording of the information signal inputted by said external input means.

24. An apparatus according to claim 20, wherein said control means outputs a predetermined signal of the copy control signal indicating permission of copying of the information signal according to a recording of the information signal generated by said microphone.

25. An apparatus according to claim 20, further comprising a video camera for obtaining a video signal.

26. An apparatus according to claim 20, further comprising compressing means for compressing at least one of the information signals to be recorded by said recording means.

27. An apparatus according to claim 26, wherein said external input means inputs a compressed information signal which is externally supplied, wherein said recording means also records the compressed information signal inputted by said third input means.

28. An apparatus according to claim 20, wherein said recording means records the information signal as a digital signal.

* * * * *